United States Patent [19]
Brass

[11] 3,787,987
[45] Jan. 29, 1974

[54] TOY MAIL BOX
[76] Inventor: Robert L. Brass, 1 Fillow St., Westport, Conn.
[22] Filed: Jan. 31, 1973
[21] Appl. No.: 328,475

[52] U.S. Cl.............................. 35/1, 46/1 R, 35/22 A
[51] Int. Cl. ............................................. G09b 3/00
[58] Field of Search...... 35/1, 8 R, 9 R, 22 A, 35 D; 46/1 R, 2

[56] References Cited
UNITED STATES PATENTS
2,774,150   12/1956   Genin .................................. 35/22 A
FOREIGN PATENTS OR APPLICATIONS
1,109,819   4/1968   Great Britain...................... 35/22 A Primary Examiner—Wm. H. Grieb
Attorney, Agent, or Firm—Roland T. Bryan et al.

[57] ABSTRACT

A toy mail box for developing the reading and manipulative abilities of a child. The toy includes several plastic blanks in the form of a letter, one of which is dropped into the upper slot of the mail box and a series of keys which correspond to each of the blanks. The child, by selecting the proper key, is able to open the mail box and remove the letter originally inserted into the box.

7 Claims, 7 Drawing Figures

PATENTED JAN 29 1974
3,787,987
SHEET 1 OF 2
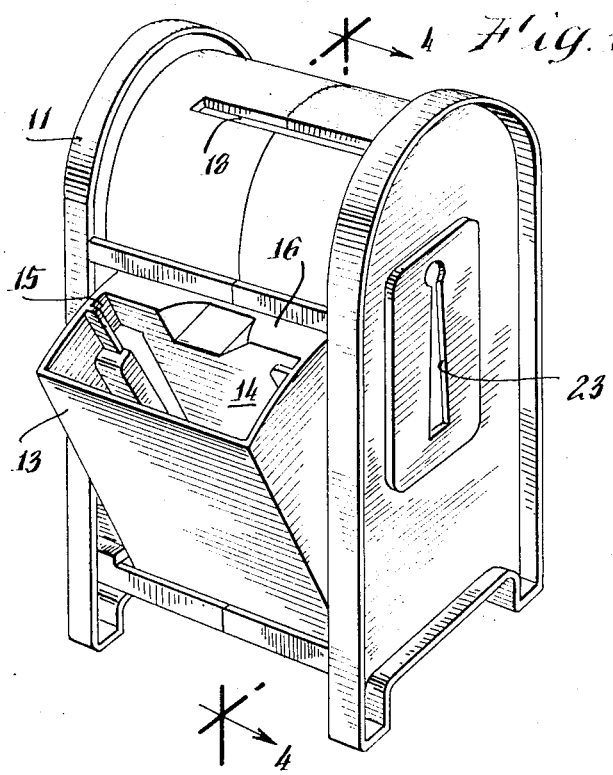
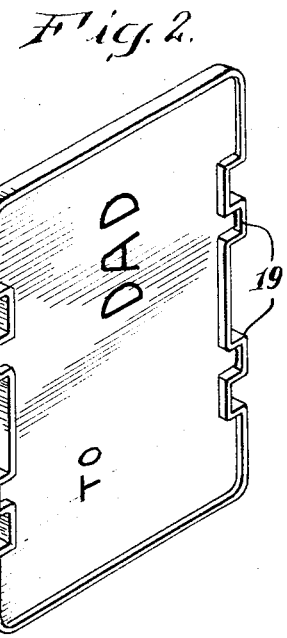
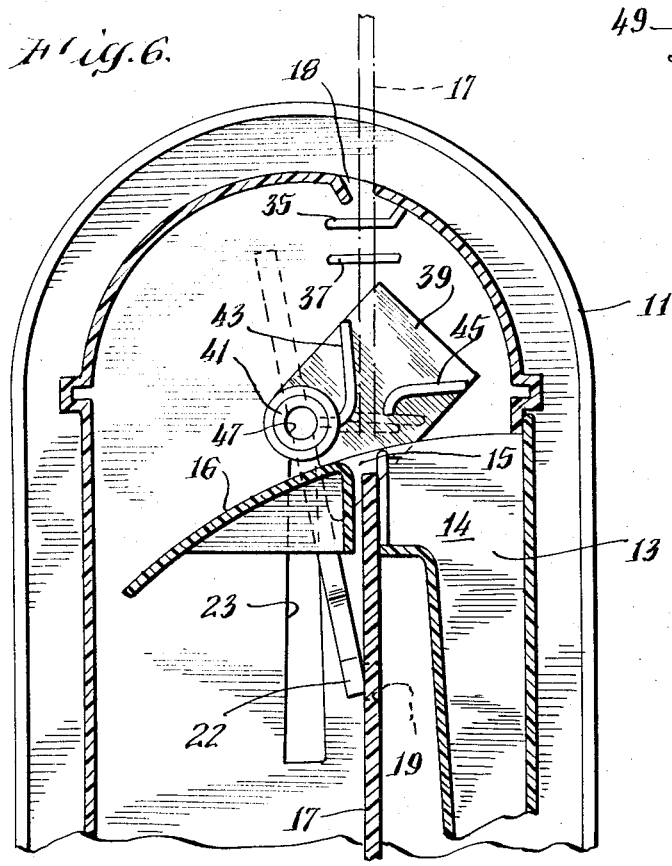
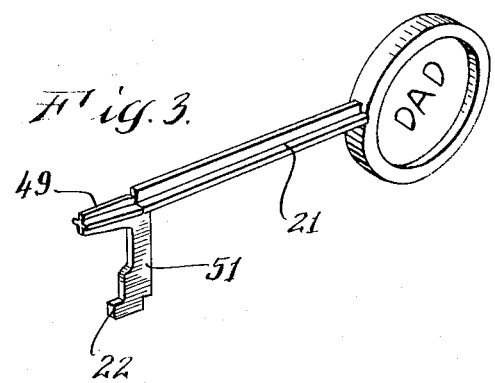
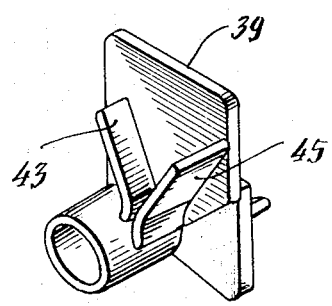

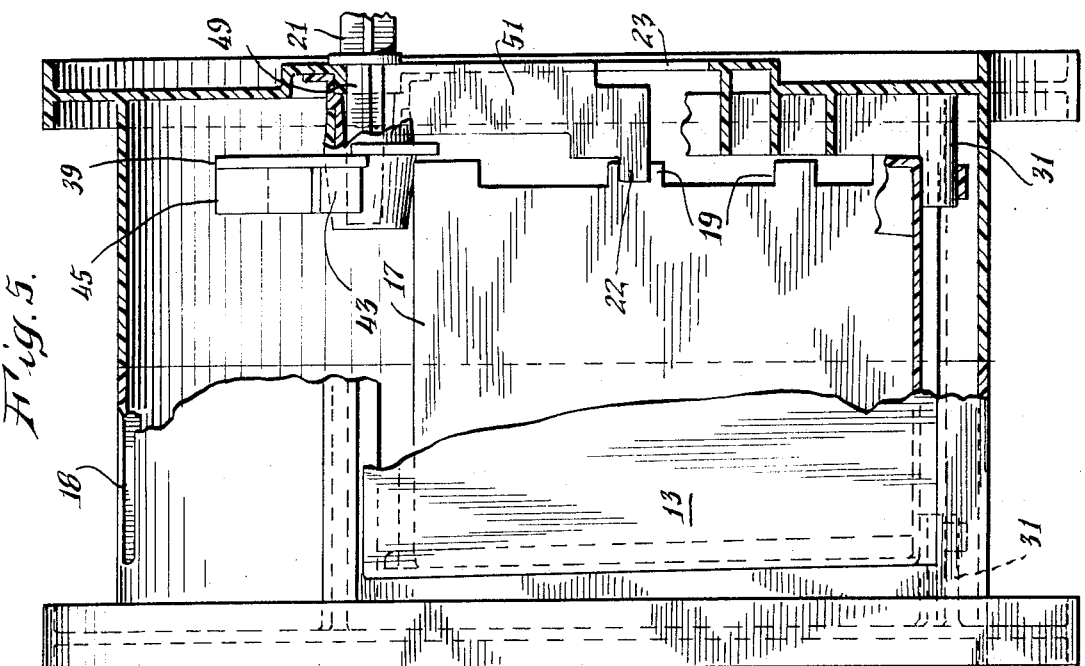
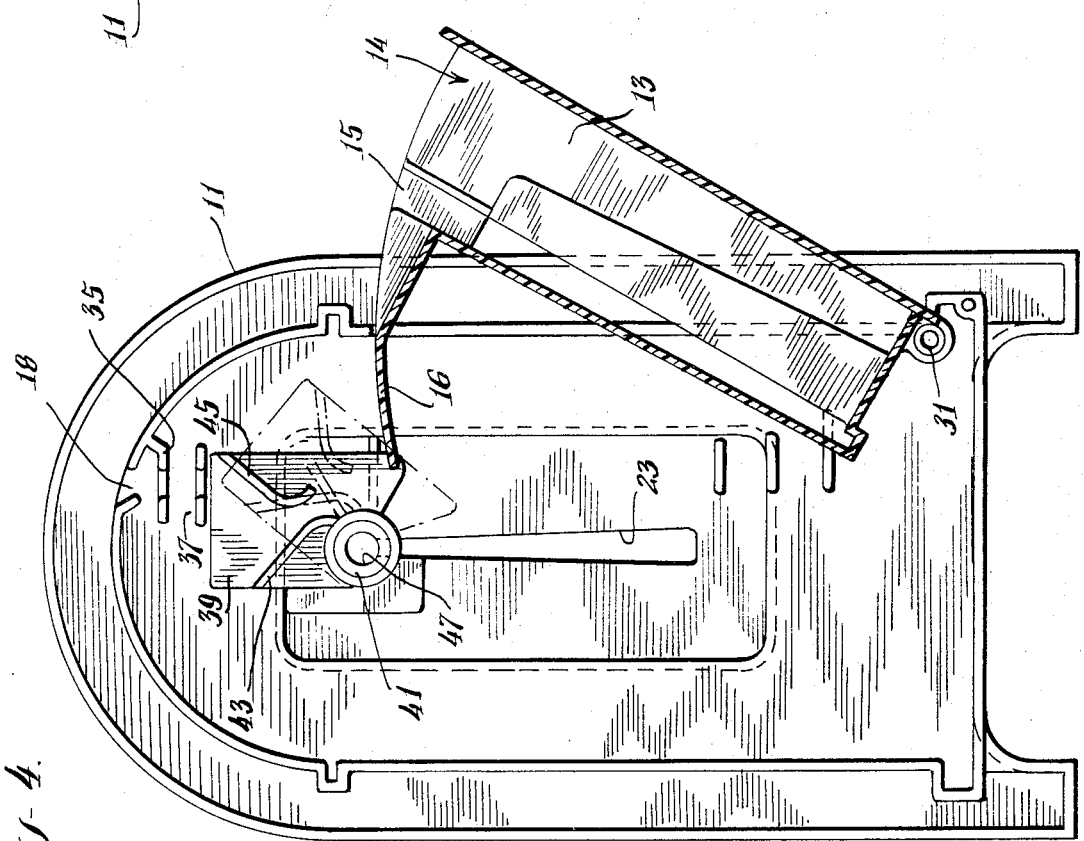

TOY MAIL BOX

BACKGROUND OF THE INVENTION

The present invention relates to a toy mail box which may be utilized to develop the reading and manipulative abilities of a child.

In accordance with the present invention the development of the reading and manipulative abilities of a child is accomplished by the child mailing a letter in the toy mail box and thereafter opening the mail box with the proper key so as to remove the letter. The letter and key are color coordinated and the name of the addressee appears on both the letter and key. The present invention assists the child in developing his manipulative abilities by requiring the child to insert the letter and key into the proper slot and to turn the key in order to open the mail box. Further, the child's reading abilities are enhanced by requiring the child to select the key that matches the letter blank so as to permit the box to be opened.

It is an object of the present invention to assist the child in the development of his manipulative abilities and coordination.

It is another object of the present invention to assist the child in the development of his reading abilities.

It is a further object of the present invention to teach the child color and shape.

An additional object to the present invention is to develop hand-eye and fit coordination.

SUMMARY OF THE INVENTION

The present invention provides a toy which will develop both the reading and manipulative abilities of a child. The toy is in the form of a mail box which has a pivotally mounted door to provide access to the inner portion of the box. The door has a carrying tray mounted thereon and is aligned with a slot at the top of the box so that when the blank is dropped in it will be held in the carrying tray. When the proper key has been inserted into the key slot, a portion of the key will contact the letter blank so as to cause the door to open. The letter blanks have a series of one or more spaces on each side so as to prevent contact between a key and a letter blank that do not correspond.

Thus, when the child has mastered the ability to select the key which corresponds to the letter blank he will be able to mail the letter, select the proper key and remove that letter from the mail box by inserting the key into the key slot and turning the key.

BRIEF DESCRIPTION OF THE DRAWINGS

FIG. 1 is a perspective view of the toy mail box.

FIG. 2 is a perspective view of the letter blank.

FIG. 3 is a perspective view of the key.

FIG. 4 is a side elevational view of the mail box sectioned along the line 4-4 of FIG. 1.

FIG. 5 is a front elevational view of the mail box which is sectioned so as to show the interengagement of the key with the letter blank.

FIG. 6 is a partial side elevational view of the mail box which is sectioned so as to show the operation of the inner components of the mail box.

FIG. 7 is a perspective view of the movable guide.

DETAILED DESCRIPTION OF THE DRAWING

The mail box 11 includes a door 13 which is pivotally mounted in the mail box so as to enclose the mail box when it is in closed position and to permit entry into the box when it is pivoted away from the mail box.

The door includes carrying tray 15 which is mounted on said door and is arranged so as to accept the letter blank 17, shown in FIG. 2, which is inserted into the mail box via slot 18 in the upper portion of mail box 11.

Rotation of key 21, shown in FIG. 3, in key slot 23 of mail box 11, will cause tab portion 22 of the key 21 to contact tab 19 of the letter blank 17 thereby causing the door of the mail box to pivot outwardly. Thus, this movement enables the child to remove the letter from said mail box. It will be noted that tabs 19 are symmetrically placed around the perimeter of the letter blank 17 so as to permit the interaction between the key and the letter blank to occur no matter what the orientation of the letter blank 17 when dropped into the mail box 18. As shown in FIG. 2, the letter is addressed to "DAD" and the matching key has the name of the addressee also.

FIG. 4 shows a sectional view of the mail box 11. The mail box includes door 15 which pivots about point 31 and is shown in open position in FIG. 4.

The door 13 contains carrying tray 15 which is aligned with the letter slot 18 so that the letter blank when inserted therein, will be held by the carrier tray. To insure that the letter blank is aligned with respect to the carrier tray, guides 35 and 37 in the upper portion of the mail box align the letter as it passes into the box. Movable guide 39 is pivotally mounted upon shaft 41 and is shown in greater detail in FIG. 7. Guide 39 has projections 43 and 45 arranged thereon so as to finally align the letter blank as it enters the carrying tray. If the letter blank is misaligned prior to its intended entry into the carrying tray, it will strike either projection 43 or 45 causing the guide to pivot about its axis on shaft 41 and to direct the letter blank into the carrier tray. The guide 39 is shown in FIG. 4 in final alignment with the carrier tray.

The door 13 of the mail box pivots about pivot point 31. When opened, both the storage space 14 and carrier tray 15 are exposed. The storage space 14, the space between the door and the carrying tray, may be utilized to store the letter blanks therein. The rear flange 16 projecting outwardly from the door, carrying tray and storage space assembly will prevent a letter blank from being completely inserted into the mail box when the door has been pivoted outwardly.

The operation of the key in opening the mail box can best be illustrated with respect to FIGS. 5 and 6. The key 21 is inserted into the key slot 23. The upper portion 49 of the keys is journaled in a cylindrically shaped aperture 47. Longitudinal notch on the cylindrically shaped aperture 47 accepts the shank 51 of the key 21 and thus provides a stop so as to permit the key to be rotated through only a small arc. When the key which corresponds to the letter blank is selected and is turned in the key slot, projection 22 on the key will strike projections 19 on the letter blank and cause the combination carrier tray and door to open. When a key not corresponding to the letter blank is turned in the key slot, projection 22 on the key will no longer contact projections 19 on the letter blank. Thus, turning the key will not cause the door of the box to be opened.

In operation a child will select from a series of letter blanks 17 a single letter blank and insert it into the slot 18 of the mail box 11. Guides 35 and 37 in the upper portion of the box will initially align the letter blank as it enters into the box. Guide 39 which is pivotally mounted on shaft 21 will provide the final alignment so that the letter blank will properly enter into the carrier tray 15. The child by selecting the proper key will open the box. The key 21 is inserted into key slot 23 wherein the upper portion 49 of the key is journaled in aperture 47. By turning the key, projection 22 on the key will strike projections 19 on the letter blank. As the key is turned further, the continued pressure of the key on the letter blank causes the combination carrying tray and door to pivot outwardly from pivot point 31 and thus open the door of the box. The child can then remove the letter blank from the box. If the wrong key has been chosen, however, the projection on the key will not strike the projection on the letter blank and thus the door of the box will remain closed.

What has been described is at present considered to be the preferred embodiment of this invention and it will be obvious to those skilled in the art that various changes and modifications may be made therein without departing from the scope of the invention.

I claim:

1. A learning toy for children which will assist a child to develop reading as well as manipulative abilities, said toy being in the form of a box including:
    a. a door pivotally mounted on the box said door having a first position wherein the box is a closed structure and a second position wherein the door pivots away from the box to permit entry into the box;
    b. a carrying tray mounted on said door;
    c. a blank;
    d. a slot in the box which is positioned with respect to the carrying tray so that the blank when inserted into said slot will fall into and be held within the carrying tray;
    e. a key; and
    f. a key slot in the box which is positioned with respect to the box so that when said key is inserted into the box, it contacts the blank causing the carrying tray, in which said blank is held, and the door to pivot away from the first position to said second position whereby the blank originally inserted into the box can be removed by the child.

2. The learning toy of claim 1 where there is a plurality of blanks having one or more spaces on the sides thereof so as not to be engaged by a key which does not correspond to the correct blank.

3. The learning toy of claim 2 wherein the spaces on the edges of the blank are places symmetrically about the sides of the blank so that the blank can be inserted into said slot with any orientation and yet leave the toy operable.

4. The learning toy of claim 3 wherein the box is in the form of a mail box.

5. The learning toy of claim 4 wherein the blank is in the form of a letter.

6. The learning toy of claim 5 wherein the blank in the form of a letter and the key which will open the carrying case are both of the same color.

7. The learning toy of claim 6 wherein the blank in the form of a letter and the key which will open the carrying case have the same word written on each blank and key so as to assist the child in the development of his reading abilities.

* * * * *